April 26, 1960 C. SCHNELL 2,934,121

COMMINUTING MACHINE

Filed April 20, 1959 8 Sheets-Sheet 1

Inventor
Carl Schnell

April 26, 1960
C. SCHNELL
2,934,121
COMMINUTING MACHINE
Filed April 20, 1959
8 Sheets-Sheet 2
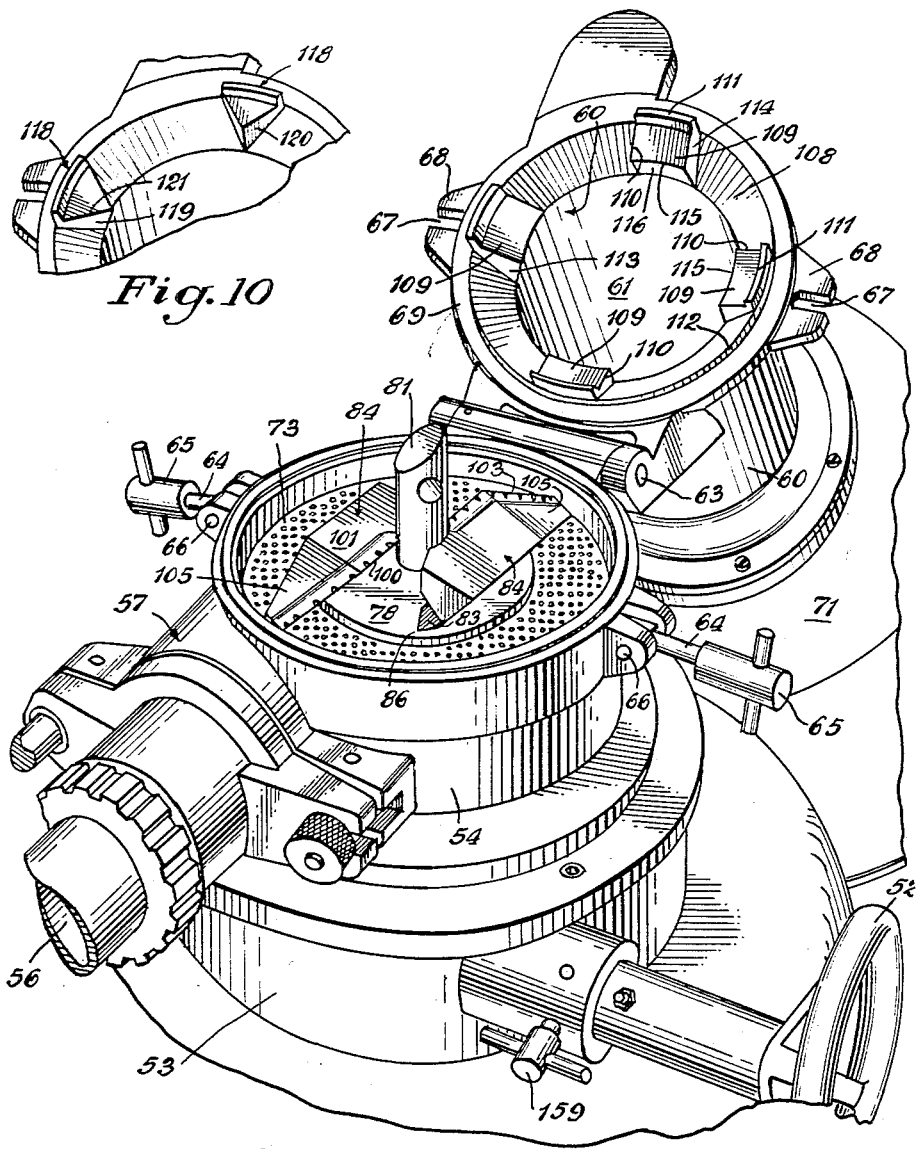
Fig. 10
Fig. 2
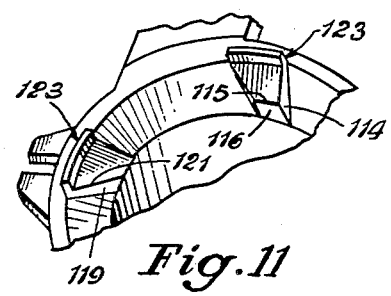
Fig. 11
Inventor
Carl Schnell April 26, 1960 C. SCHNELL 2,934,121
COMMINUTING MACHINE
Filed April 20, 1959 8 Sheets-Sheet 3

Inventor
Carl Schnell

Inventor
Carl Schnell

April 26, 1960 C. SCHNELL 2,934,121
COMMINUTING MACHINE
Filed April 20, 1959 8 Sheets-Sheet 5

Inventor
Carl Schnell

April 26, 1960 C. SCHNELL 2,934,121
COMMINUTING MACHINE
Filed April 20, 1959 8 Sheets-Sheet 6

Inventor
Carl Schnell

April 26, 1960 C. SCHNELL 2,934,121
COMMINUTING MACHINE
Filed April 20, 1959 8 Sheets-Sheet 7
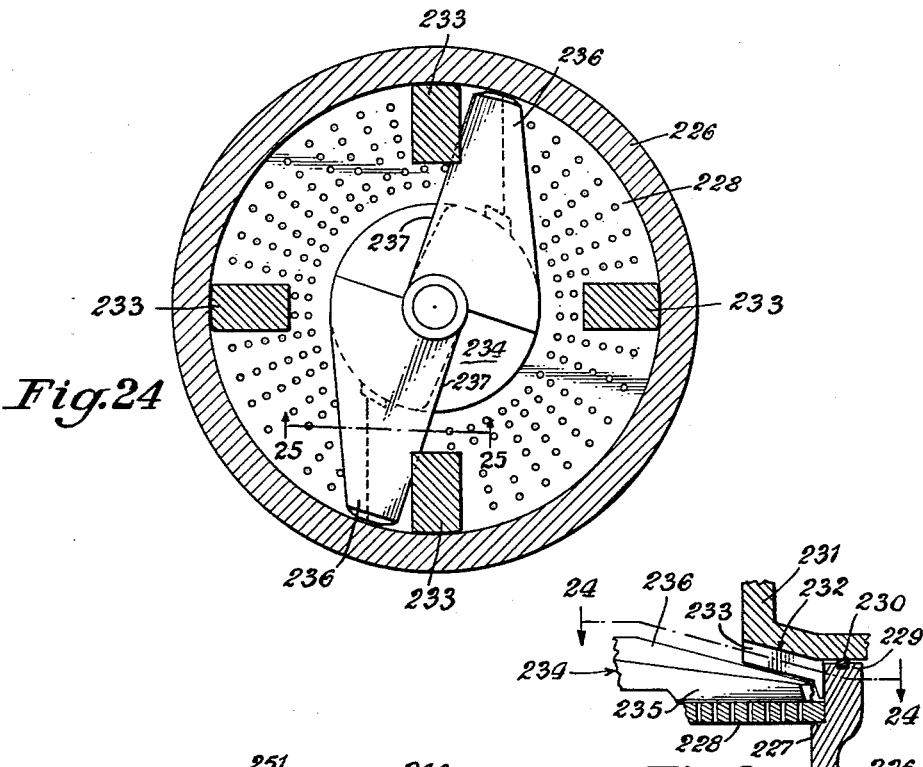
Fig.24
Fig.23
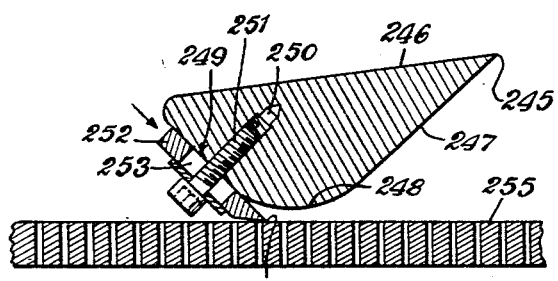
Fig.26
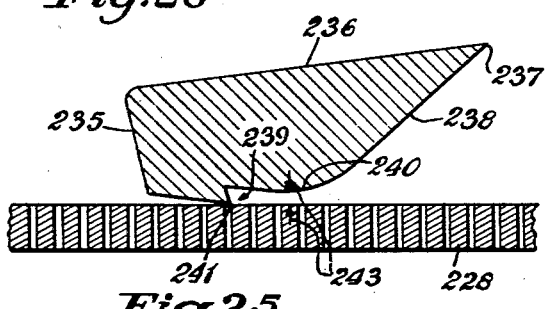
Fig.25
Inventor
Carl Schnell April 26, 1960 C. SCHNELL 2,934,121
COMMINUTING MACHINE
Filed April 20, 1959 8 Sheets-Sheet 8

Inventor
Carl Schnell

United States Patent Office 2,934,121
Patented Apr. 26, 1960

2,934,121

COMMINUTING MACHINE

Carl Schnell, Winterbach, near Schorndorf, Wurttemberg, Germany, assignor of one-half to The Griffith Laboratories, Inc., Chicago, Ill., a corporation of Illinois Application April 20, 1959, Serial No. 807,350

Claims priority, application Germany October 18, 1958

24 Claims. (Cl. 146—192)

The present invention relates to comminuting machines and component parts thereof.

The present application is a continuation-in-part of my U.S. application Serial No. 675,996, filed August 2, 1957, as a continuation-in-part of Serial No. 615,074, now abandoned, which was filed October 10, 1956, as a continuation-in-part of Serial No. 572,543, filed March 19, 1956, now Patent No. 2,840,318, issued June 24, 1958.

The machines described in said original and later-filed applications are useful for comminuting many materials, especially agricultural products including meat and animal products for preparing sausage and other comminuted meat products. When such machines are used for comminuting animal products, special precautions are necessary, and these bear upon the construction and operation of the machine.

For most purposes raw meat material must be comminuted under conditions to avoid heating it. It is best when discharged substantially free from entrapped air. It must be comminuted at a high rate of feed and discharge.

The fineness of comminuting is controlled by selecting from a supply of removable perforated plates, one with relatively small or large holes for relatively fine or coarse products. In the case of fine grinding, the meat commonly mixed with cold water or ice for the desired meat formulation may be discharged as an emulsion, the fat being emulsified by protein, of which lean meat and raw animal skin are examples. The finer the comminution the greater the tendency to heat the material while it is recirculated and cut finer, and accordingly, the structure of the cutters is important.

Animal skin presents difficulties in comminuting because of its toughness. Heretofore, it has been cooked to ease the work of comminuting. By the structure and operation of the improved machine of the present disclosure the work, and hence the heat generated, in comminuting raw animal skin is greatly lessened, and a resulting emulsion is relatively free of air bubbles.

The present invention pertains to centrifugal comminuters or grinders, as distinguished from the auger-fed meat choppers and grinders, which also have perforated plates and cutters, but which operate at relatively slower speeds at which the augers are effective to feed meat to the cutters. In centrifugal comminuting machines the cutters have the additional functions of propelling the material through the perforated plate, and of mixing the various fed components.

Centrifugal machines of the type to which the present invention is applicable have a substantially unencumbered supply chamber into which material to be comminuted is constantly fed and thoroughly mixed, in which chamber the cutters rotate at high-speed over and against a perforated discharge plate and below the open space above the cutters. An inherent result is rapid circulation and mixing of material by the cutters, involving flow to the periphery as in centrifugal pump action followed by flow inwardly from the periphery. This circulation and flow generates heat, which in the case of meat products may adversely affect the quality of the discharged material.

The quicker the meat is cut to size for discharge through the selected plate, the less the time it is present in the chamber to be heated by circulation and friction. Dull cutters prolong the time for comminution and hence increase the heating.

In the accompanying drawings, in which my invention is shown:

Fig. 2 is a perspective enlarged view of a portion of the machine opened for assembling certain parts;

Fig. 10 is a fragmentary view similar to a portion of Fig. 2 showing a modified lug;

Fig. 11 is a view similar to that of Fig. 10 showing a second form of lug combining features of the lugs of Fig. 2 and Fig. 10;

Fig. 23 is a fragmentary diametric cross-section showing a portion of the housing and wall forming the comminuting chamber and portions of the rotor and plate to illustrate the relation of the lug to the cutter arm;

Fig. 24 is a plan view partially in cross-section taken on the line 24—24 of Fig. 23 showing a modified rotor located in a comminuting chamber having lugs therein;

Fig. 25 is an enlarged cross-sectional view similar to Figs. 18 and 20 on the line 25—25 of Fig. 24 illustrating the relation of the cutter to the perforated plate;

Fig. 26 is a cross-section similar to Fig. 25 of a modified cutter having an adjustable blade providing the trailing cutting edge;

Machines of the type described preferably have means to remove from the machine the material discharged through the perforated plate. Commonly, this is a centrifugal pump rotor, or throw-out rotor having radial vanes or other members which hurl the discharged material to the periphery of a discharge housing with a resulting generation of pressure effective to force it out through a nozzle or other small orifice. For this reason a powered shaft which carries the cutters is also used for the throw-out rotor, and as a result the powdered shaft or parts carried thereby pass through the perforated plate. However, it is to be understood that separate shafts for the rotary cutters and for the throw-out rotor may be employed, and no rotary member need pass through the plate which carries the perforations.

Figure 1:
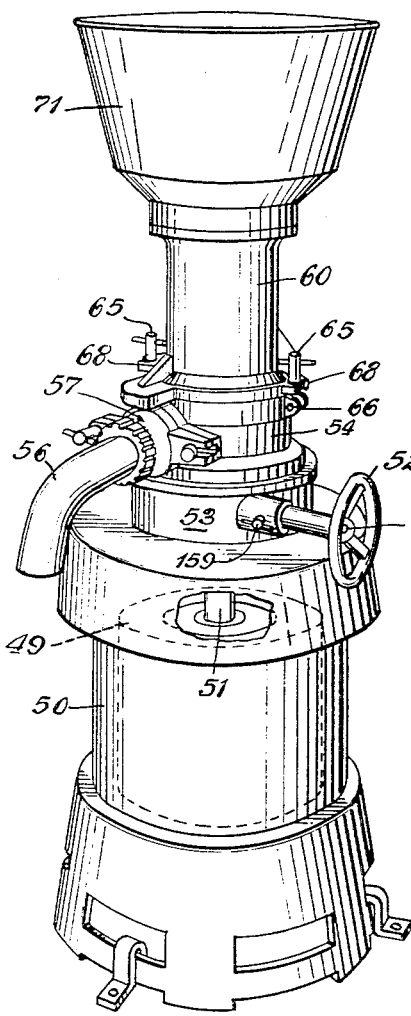
Fig. 1 is a perspective view of a machine as used.
Figure 4:
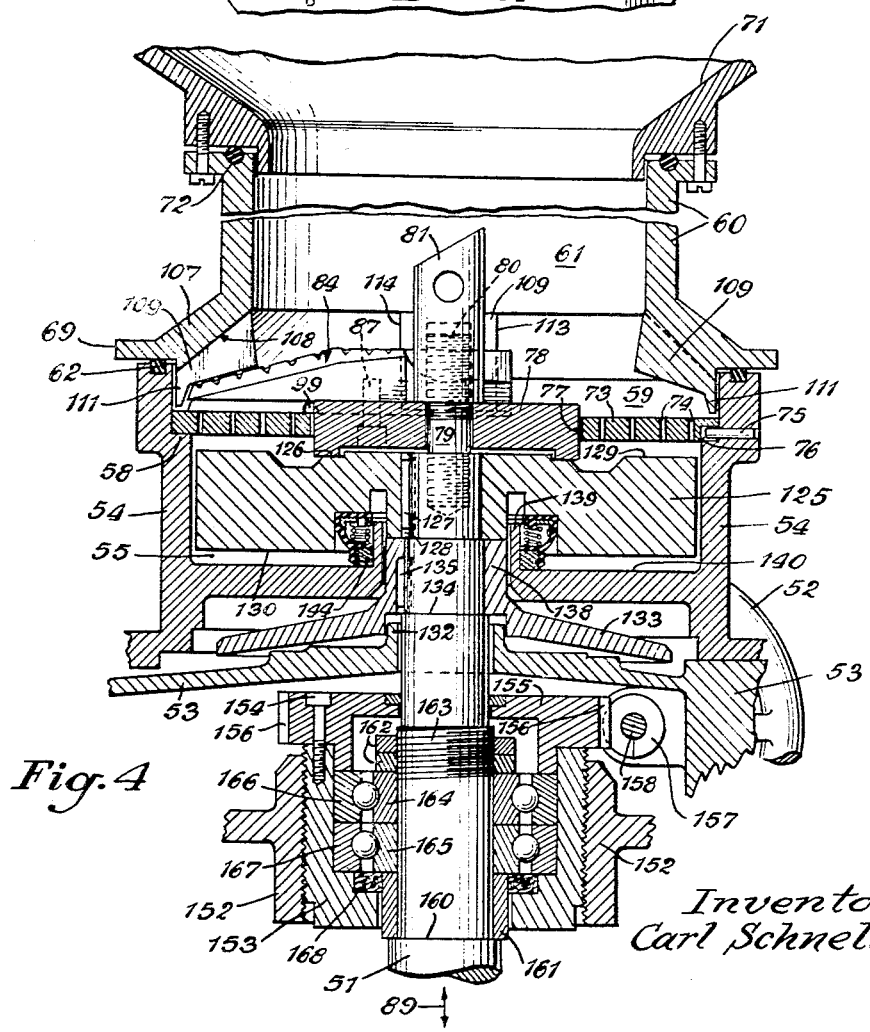
Fig. 4 is a cross-section through the perforated disk and portions of the housings above and below it taken on line A—A of Fig. 3 in the direction of the arrows.

In Fig. 1 is shown a general view of a machine embodying the present invention. It has a base 50 in which is fixed a powerful electric motor with casing 49 and vertical motor shaft 51 (Fig. 4) which shaft may be raised and lowered relative to casing 49 by turning a hand-wheel 52 by mechanism (later described) within the section 53. Housing 54 has a pump chamber 55 containing a throw-out rotor (later described) which forces material out the spout 56 from a tangential outlet 57. The upper part of the housing 54 has an internal shoulder 58 (Fig. 4) for supporting a removable plate above which, housing 54 provides a cylindrical cutting chamber 59. Above the housing 54 is a housing 60 providing supply chamber 61. Housing 60 fits tightly over housing 54 with a packing ring 62 (Fig. 4). The housing 60 is hinged at 63 (Fig. 2) to housing 54 so as to be swung away in a vertical arc. Swinging bolts 64 with hand nuts 65, hinged at 66 fit into radial slots 67 in lugs 68 which extend from a bottom flange 69 of the housing 60. The top of supply chamber 61 is extended by a flaring filling funnel 71 (Fig. 1) having a tight seal against packing 72 (Fig. 4).

Fig. 4 shows a selected plate 73 with perforations 74 resting on shoulder 58 and thus forming the bottom of cutting chamber 59. A shear pin 75 through the wall of the housing 54 into a hole 76 in the plate holds the plate from turning except when the pin may shear in some emergency condition for which purpose the pin is made suitably small.

When the power shaft 51 rises from the motor in the base 50, the plate 73 has a cylindrical-walled central opening 77 in which is located with a minimum of clearance for free running a cylindrical cutter-head or knife-holder 78, removably mounted with a slip-fit over stud 79 at the end of power shaft 51. The stud 79 is threaded into the end of shaft 51 and provides a threaded extension 80 of the shaft for receipt of a tightening nut 81 which compresses knife-holder 78 between it and a throw-out rotor on shaft 51, later described. Nut 81 is cylindrical with a truncated end terminating above the level of the cutters 84.

Figure 5:
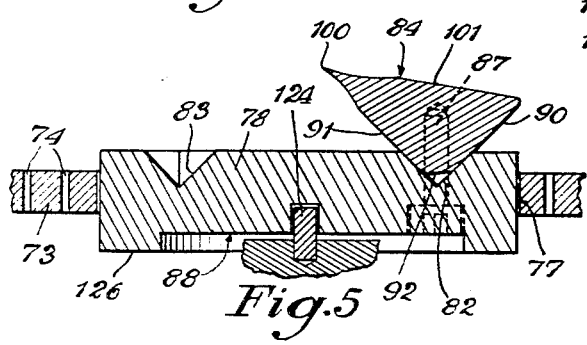
Fig. 5 is a cross-section of a detail of a cutter taken on the line B—B of Fig. 3 in the direction of the arrows.
Figure 3:
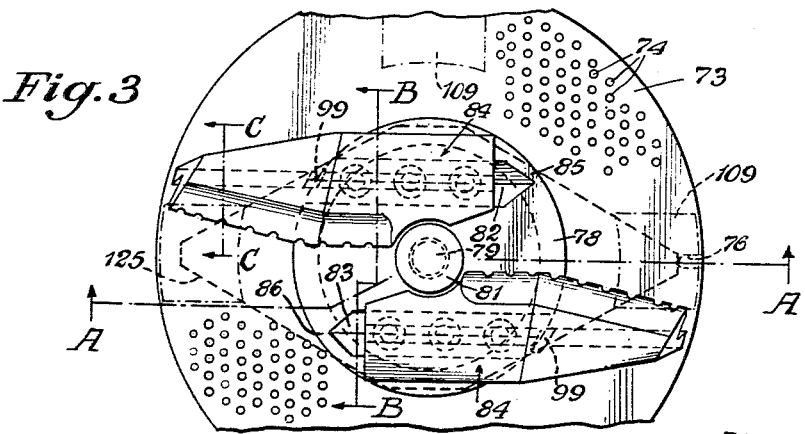
Fig. 3 is a top plan view of the cutters and of a perforated disk looking down upon such elements as shown in Fig. 4.

Figs. 3 and 5 show the knife-holder 78 with two parallel grooves 82 and 83 therein in one end of each of which is mounted a cutter 84. The other ends are preferably closed as shown at 85 and 86. The cutter 84 has a suitable cross-section (Fig. 5) to fit a groove 82 or 83 of which the contour may vary from that shown. Bolts 87 entered through holes in the underside 88 of the cutter-head 78 thread into openings therefor in the cutter 84 to hold it tightly in its groove and to position it properly.

As shown in Fig. 3 there are two cutters 84 extending in opposite directions as mounted in said two grooves. The cutters are substantially identical when new, and as sharpened, and are so mounted that they are balanced for high speed rotation counterclockwise in Fig. 3, between bounding planes at right angles to the axis of rotation.

Figure 6:
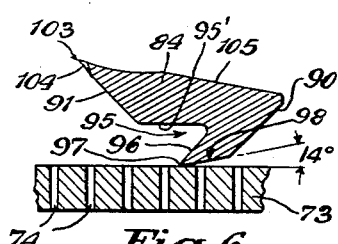
Fig. 6 is a cross-section through the same cutter taken on line C—C of Fig. 3 in the direction of the arrows, showing also its relation to the perforated plate.

The projecting arm portion of each cutter 84 has a leading edge which may be considered or designed to shear or cut, and a trailing cutting edge with a propelling surface connecting said edges. The trailing cutting edge rotates in the lowermost boundary plane and the solid of revolution generated by said leading and trailing edges includes the entire body of the projecting arm. The surface of the arm which in rotation follows the leading edge slopes smoothly away from the path of rotation traveled by said leading edge and also slopes smoothly toward the plane of rotation of the trailing cutting edge, as the distance between the two edges diminishes toward the tip of the arm. The trailing cutting edge is so located that it is the trailing line of an acute angle with a radial line from its axis of rotation to its tip, and the leading edge forms an outwardly pointing acute angle with the plane of rotation of the trailing cutting edge. The vertical adjustment of the shaft 51 by the hand wheel 52 is indicated by the two-headed arrow 89 (Fig. 4), and the adjustment for operation is such that the lowermost bounding plane containing the said knife-edges is brought to the perforated plate 73 so that the knife-edges skim along the surface of the plate as best shown in Fig. 6, with or without a pressure between them, which pressure is controlled by adjusting the hand wheel 52.

The cutters 84 are preferably made by machining bar stock. Each piece of bar stock, as a cutter 84, has a mountable end to lie over the knife-holder 78 and a free end projecting therefrom, which free end both cuts and propels. The free end or projecting arm portion is tapered outwardly from the upper part as shown toward the lower part having the said knife-edge over the plate 73. Because the cutters rotate at high speed, for example, 3000 r.p.m. in one model and 3600 r.p.m in another, the taper offers numerous advantages. For one, the inertia is reduced. More importantly, however, the broadside-effect presented to material in the supply chamber 61 is reduced by the taper, thereby reducing the heat-producing swirling and centrifugal effects on the material in the chamber. Also, by reducing the broadside-effect by the taper, the free space above the cutter arms is enlarged for return of material from the periphery to the center for recirculation. Still another advantage is a shearing action when certain lugs are present as later described.

The mounted end of the cutter 84 is shown in cross-section in Fig. 5, which is substantially the cross-section of the bar stock from which it is made. Essentially, the bar as it rotates has a first or rear face 90 and a second or forward face 91 generally angular to each other. For mechanical simplicity and convenience only, these faces are planes, and are at right angles to each other, wherefore the grooves 82 and 83 are right-angle grooves.

The normal junction of said faces 90 and 91 is cut away by a bottom or third face 92 (Fig. 7) which at the mounted end is preferably disposed so that it may rotate on the plate in the lowermost bounding plane of rotation and which intersects the plane of said forward face 91 in a straight line 93. Bottom face 92 is flat to facilitate drilling holes 94 (Fig. 7) for mounting the cutter. From the end of the portion having the cross-section shown in Fig. 5, the bar begins to taper outwardly and downwardly as mounted, a cross-section of the tapered portion being shown in Fig. 6 as it lies over the plate 73. In this free-end tapered region the forward face 91 is provided with a recess 95, of which the inclined flat wall 96 terminates in a straight line which in a new cutter may be an extension of the line 93, in a manner to form an acute-angle cutting edge 97, which is a straight line as a result of the specific structure illustrated.

Reference is made above to reduction of centrifugal effect on the material in the chamber. Since the centrifugal force is greater as the distance from the axis increases, it is important to maintain a substantially uniform outward flow ahead of the rotor.

Figure 7:
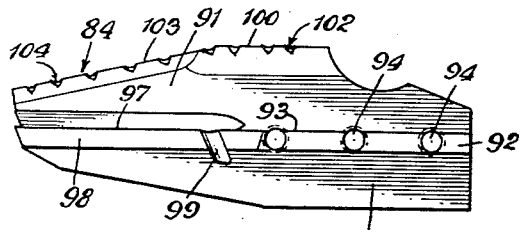
Fig. 7 is a view of the cutter of Figs. 3 to 6 looking directly at the underside as mounted in Fig. 4.

When the illustrated bottom face 92 of Fig. 7 is at equal angles with the faces 90 and 91, it will, if extended to the free end, run flat on the plate 73 as the cutting edge of a new cutter skims the face of the plate. Experience has shown that such an extended broad face 92 so running on the plate creates friction and unduly heats the material, not so much as a mass, but locally at a lubricating layer of material at the interface. To avoid this heating effect, and to lessen the drag on the motor by the friction, the said face 92 at the mounted end is not extended to the free end to form the knife-edge 97. Rather, the bar is slightly machined back from the knife-edge 97 forming a relief face 98 (Figs. 6 and 7) which is raised from and inclined away from the plate 73 in operating position at an angle, one of 14° being satisfactory. The relief face 98 back of the knife-edge 97 overlies the plate 73 and is preferably extended slightly into the mounting groove on cutter-head 78. This permits the cutter to be resharpened by grinding on face 98, thus raising the level thereof with reference to face 92 and forming a new knife-edge 97 at the intersection with wall 96 of recess 95. When the cutters are to be resharpened, the cutter-head 78 with the cutters mounted in it, is placed in a suitable grinder. To protect the rim of the cutter-head from contact with the grinding wheel, a notch 99 is formed into the cutter across knife-edge 97 partly within and partly without the said rim.

The propelling cutting rotor as above described has at least one propelling arm with a leading edge and a trailing cutting edge. The propelling surface connecting these edges is shaped to force material axially forwardly toward the trailing edge and the perforated plate, and it includes a portion more directly facing into the path of said forward propulsion which portion is adapted rapidly to diminish said rate of forward propulsion in an area immediately in advance of the trailing edge.

The propelling surface that connects the leading and trailing edges includes said recess 95. The propelling face 91 propels material toward the plate, and at the upper roof of the recess which forms a heel 95', the rate of such forward propulsion is rapidly diminished. Because of the shape of the pressure heel or roof 95' of said recess 95 and its structural relationship with the perforated plate, the larger particles of material being comminuted are squeezed in the recess or pressure pocket 95 and to a limited extent into the perforations of the plate. As the trailing cutting edge is resharpened after use to a new knife-edge such as 97, the height (distance between the perforated plate and roof or heel 95') of the pressure pocket is reduced. This reduction of the thickness or height of the pressure pocket, in comminuting meat increases the efficiency or effectiveness of the cutting rotor. This improved cutting action is believed, in the case of meat, to result from the ability of the pressure pocket or heel to cause smaller and smaller pieces of meat material to be subjected to a squeeze-cutting action.

Experience has shown that as the trailing cutting edge 97 is resharpened, the machine becomes more efficient in comminuting meat, as measured by the rate of production. The pressure pocket 95 best functions as described in the comminuting of meat, when the openings in the plate are not larger than the height of the pressure pocket.

In the drawings, the recess 95 is formed to provide an abrupt change in the rate of forward propulsion toward the plate as material reaches the overhanging roof or heel 95', which is the upper face of the pressure pocket 95. The cutting edge 97 cooperates with the pressure pocket and cuts or shears at the edges of the holes of the plate those meat particles that have been pressed in part into holes in the area between said heel and said plate.

In addition, the roof or heel is shown in the drawings to extend ahead of the trailing cutting edge 97 in the direction of rotation. The pocket so formed with the plate diminishes the rate of forward propulsion in the axial direction, effected by the face 91.

As the two cutters on one knife-holder 78 are provided with newly sharpened knife-edges 97 by removal of material, the cutter-head 78 must be correspondingly lowered with respect to plate 73 by adjusting the position of the shaft 51 by the hand wheel 52. The lowering of knife-head 78 into the plate 73 may be such that the bottom of grooves 82 and 83 lie below the level of the bottom of plate 73. Were the ends of the grooves beyond the cutters 84 open rather than closed as shown at 85 and 86 (Figs. 2 and 3), coarser particles than would pass plate 73 would find a channel via the groove into the pump chamber 55.

The cutter 84 also has its leading edge formed as a second and upper knife-edge uppermost in the mounted position of the cutter 84 and uppermost of the regions of forward face 91 which are most remote from the knife-edge 97 and bottom face 92. The upper knife-edge has a section 100 over the cutter-head as a sharpened edge between the face 91 and a top face 101 of the bar stock (Fig. 5). Said knife-edge 100 is parallel to the lower knife-edge 97, is hollow-ground on both faces, as shown with some exaggeration, and may be serrated as shown at 102 to give a sawing action. The upper knife-edge also has a portion 103 on the tapered free end of the cutter, and therefore, it angles toward the knife-edge 97. It likewise is hollow-ground and may be serrated as shown at 104. Rearwardly of knife-edge 103 is the face 105 tapering from bar face 101, and sloping smoothly both rearwardly in rotation and outwardly toward the plane of rotation of the trailing cutting edge 97. Because the trailing cutting edge lies rearwardly of an axial plane passing through its tip, the centrifugal force acting on meat pieces in the pressure pocket 95 is opposed.

The vertical thicker part of the cutter 84 extending from the top face of cutter-head 78 to the uppermost knife-edge 100, initiates outward flow of an equally high layer of the mass being circulated. As this mass is moved radially it is cut by the downwardly sloping portion 103 of the upper knife-edge. The upper knife-edge effects impact-cutting on striking material and also draw-cutting as radially moving material slides over the knife-edge.

Figure 8:
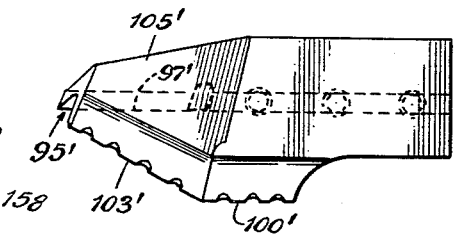
Fig. 8 is a modified form of cutter used in apparatus of smaller diameter than shown in Fig. 4.

Fig. 8 shows a modified and shorter cutter which is used with the same knife-holder 78, but in a machine having a smaller diameter of perforated plate and supply chamber. As shown, it is made of the same bar stock as the longer cutter of Fig. 7. The cutting arm is shorter resulting in a shorter lower knife-edge 97', a shorter upper-knife portion 100', a shorter upper-knife portion 103' at a greater angle to portion 100', a more sloping tapered face 105', and a shorter recess 95'.

The machine as illustrated has other features which add to the efficiency of the machine using the cutters of the present invention.

For example, the housing 60 enlarges near its bottom to form a terminal upwardly tapering frusto-conical wall section 107, above a terminal supporting flange 69 (Fig. 4) which fits over the packing ring or seal 62, thus to exclude air from the chamber by possible suction from below the plate, as later described, and thus to avoid the danger of air being emulsified into the composition.

The frusto-conical section 107 (Fig. 4) is spaced an appreciable distance above the path of upper knife-edge 103 in order to provide a space over the cutter for flowing material to move up and out of the path of the cutter and be baffled back toward the center by the sloping ceiling 108.

Further, to minimize circulation and hence heating, lugs 109 may be provided projecting from sloping face 108 inwardly over the path of cutters 84. These lugs in the form as shown in Fig. 2 have vertical extent and lateral walls facing into the direction of rotation, so that they abruptly stop spiral circulation and cause quick return of flowing material toward the center. Lugs 109 preferably have lower side edges 110 positioned for shearing clearance with the cutter edges 103, so that large pieces in the path of the cutter are more quickly cut. Lugs 109 have arcuate flange portions 111 fitting inside of the housing 54 to insure proper fitting of housings 54 and 60 and to shear material at the tips of cutters 84. The upper portions of flanges 111 are part of a peripheral ridge 112 just inside housing 54. The annular space between the housing 54 and the path of rotation of the tips of the cutters provides a channel in which material centrifugally brought to the wall of the housing 54 may move upwardly between lugs to the sloping ceiling 108 for return toward the center. The centrifugal force moving the mass to the periphery has the effect of compacting it under pressure of the force against the peripheral wall giving it greater solidity and less fluidity, whereby it is resultingly more easily cut. The obstructing effect of the lugs adds to the compacting force. However, due to the open space above the ends of the cutters, the mass is not trapped at the periphery and may move upwardly. In so doing, it is impeded vertically by the frusto-conical wall and horizontally by the lugs, thus to aid in the compacting effect, and thus to be baffled inwardly by said wall.

The angle between each lug edge 110 and the knife-edge 103 may be varied both by the angle of the knife-edge with respect to the radial direction, and by the form of the lug. The form of the lug controls the positions and areas of its faces, and hence the deflecting action of those faces on the swirling and down-feeding contents.

The lugs 109 as shown have parallel side faces 113 and 114 (rear lug in Fig. 4) and a substantial width, corresponding to an arc of about 20° at the periphery of plate 73. In proportion to the width is the shearing action of the knife-edge 103 as it passes arcuate front edge 115 of the lugs at a slight angle in which to engage pieces to be cut. The angles of the knife-edge 103 with the shearing edges 110 and 115 of the lugs 109 are readily observed at the right hand lug in Fig. 3 showing the position of the lug in dotted lines as it is finishing its scissors-action in cooperation with knife-edge 103. By reason of the lug form as shown, the inward face 116, extending between the shearing edge 115 and the periphery of the smaller base of the frusto-conical section 107, provides an inwardly sloping baffle for material coming down the wall of the supply chamber 61.

As shown, the scissors-like shearing between knife-edge 103 and the side edges 110 of the lugs 109 takes place outwardly as the cutter rotates (see Fig. 3). By changing the angle of the near face 113 which meets the cutter, the scissors-action may be made to take place inwardly and at the same time the modification of face 113 receives less impact from the swirling material, which results in less vibration. Fig. 10 shows a modified lug which is pointed, and it is to be understood that other forms of lug may be employed.

In Fig. 10, the modified lug does not offer advantage from the shearing edge 115 of the lug 109 at the bottom of the broad inner face 116 shown in Fig. 2, and it loses much of the baffling effect of that face on down-feeding material.

Fig. 11 shows a modified lug one half of which is like the lug shown in Fig. 2 and the other half is like the lug shown in Fig. 10. Thus, the advantages of both forms are secured.

In Figs. 10 and 11, only the modified portions are newly designated. In Fig. 10 the tapered lug 118 has side faces 119 and 120 corresponding to parallel faces 113 and 114 of lugs 109, and provides scissoring edge 121 at face 119 to shear with knife-edge 103, with which it forms an inwardly opening scissors' angle between the shearing edges, into which centrifugal force hurls the compacted material.

In Fig. 11 the modified lug 123 retains the face 114 of lug 109, a vertical half of face 116, and half of shearing edge 115 of lug 109. Lug 123 has the face 119 and its edge 121 of the lug in Fig. 10 to effect initial shearing by scissors-action at the lug and angularly to baffle material toward the center.

When the machine operates at 3600 r.p.m. with four lugs and two cutters as shown, there are 28,800 shearing actions per minute, which greatly contribute to the speed of comminution, to the reduction in circulation of material awaiting final comminution and passage through the plate, and hence, to a reduction in the generation of heat by circulation and friction.

Although the mounted cutters in high-speed rotation cause their forwardly inclined faces 91 between the knife-edges 97 and 103 to function as propeller blades, it is preferred to enhance the forces causing passage of material into and out of the machine. One means to this end is a centrifugal pump having an ejection rotor in ejection chamber 55, under plate 73 (Fig. 4). The preferred rotor 125 is generally diamond-shaped as shown in dotted outline in Fig. 3, and in cross-section in Fig. 4, which rotor removes material from the underside of plate 73 and forces it by centrifugal pump action to the periphery of chamber 55 for discharge through outlet 57 into spout 56. Rotor 125 supports knife-holder 78 at a peripheral lip 126 on the underside. Pins 124 fixed in the rotor 125 enter holes in the knife-holder 78. Rotor 125 is fixed to the shaft 51 by a key 127 in the shaft and in key-slot 128 in the rotor. The top face 129 of rotor 125 is spaced away from the underside of plate 73, whereby the shaft 51 with the rotor 125 and knife-holder 78 may be raised from the position shown. The lower face 130 of rotor 125 is raised from the floor of chamber 55 so that the shaft 51 may be lowered, as the cutters are sharpened from the form shown.

The housing 53 (Fig. 4) is separate from the housing 54, and contains the adjusting mechanism. Shaft 51 runs free in an opening in a collar 132 at the top of housing 53. When the hereinafter-described seal at the bottom of chamber 55 is absent, it is desirable to protect the adjusting mechanism from possible contact with material from the ejection chamber 55, especially leaking brine from the curing salt. This is done by a rotary canopy of flinger plate 133 resting on shoulder 134 of the shaft 51 and keyed at 135 to shaft 51 in a collar portion 138 which runs free within a collar 139 forming part of housing 54. The ejection rotor 125 is supported by collar 138 on the flinger plate. Thus, the top nut 81 clamps between it and flinger plate 133, the knife-holder 78 and the rotor 125.

Heretofore, it has been known to admit air into an ejection chamber such as 55 in the vicinity of the rotor shaft bearing a centrifugal pump rotor, whereby the suction effect draws in air and the air assists in ejection of material. It has been found that such admission of air is disadvantageous. It mixes air bubbles into the discharged material which is not only oxidizing in effect on meat, but also troublesome in using the mass for sausage and like encased meats. Air bubbles lead to fat and jelly pockets in encased or other forms of comminuted meats. By eliminating air bubbles more compact products are obtained, and less casing is required per unit weight of meat, such casings being an important item in cost. In addition, the admission of air into chamber 55 lessens the suction effect of the rotor 125 on material above the perforated plate, thus increasing the time for material to pass through the machine, and hence, increasing the time for circulation and consequent heating.

To avoid these disadvantages and to secure important advantages, the ejection chamber 55 is sealed except for exposure to the underside of plate 78 and for exposure to the outlet 57 for spout 56.

Fig. 4 shows a suitable seal positioned to exclude entry of air at the shaft 51. Because the shaft is vertically adjustable the seal is made expansible and compressible, when it functions between floor 140 of the ejection chamber 55 and the underside of rotor 125.

Figure 9:
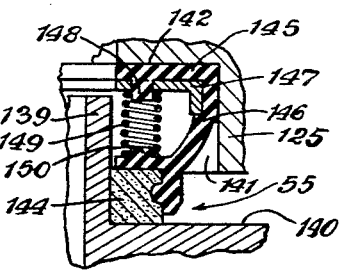
Fig. 9 is an enlarged fragmentary view in cross-section of that portion of Fig. 4 which shows a seal.

From the floor 140 the said upstanding annular collar 139 spaced from the shaft 51 extends into a right-angular recess 141 (see Fig. 9) in rotor 125, which recess has a face 142 parallel with floor 140 and perpendicular to the axis of shaft 51. A ring seal is located between face 142 and floor 140.

The ring seal (Fig. 9) comprises a graphite or plastic ring 144 which runs on floor 140, and a flexible resilient casing of rubber or like material of which an annular face portion 145 contacts face 142. The casing extends downwardly and inwardly by portion 146 which at its end is forked in cross-section to enclose and carry said ring 144. At the inside junction of casing portions 145 and 146 is an annular flanged metal ring 147 having holes through and beyond which project small integral extensions 148 of the casing face portion 145. These extensions enter and position ends of compression springs 149 of which the other ends likewise receive projections 150 from the casing section 146. The springs 149 render the seal resilient, and the flexible resilient casing portion 146 keeps the space sealed.

The ring seal is a removable unit, easily replaced. Its effectiveness is evidenced by the fact that operations without it greatly reduce the load on the motor.

The remainder of the machine as shown in Fig. 4 may vary in construction from the arrangement shown. It includes means to adjust the shaft 51 vertically to position the cutters properly on the plate. In the machine as shown such means is placed as near as mechanically practicable to the cutters and plate. Because the portion of the shaft within the motor is heated and cooled, as the motor is run and idle, such portion changes in length. In order that this change is not so transmitted as to change the adjustment during an operation, the adjusting means is above the motor which is lowermost in the machine.

Housing 53 (Fig. 4) has an inner collar portion 152 with an internally threaded opening concentric with shaft 51. A circular threaded box 153 is mounted in said opening. Box 153 at the top is secured by screws 154 to a ring gear 155 having teeth 156 meshing with a worm gear 157 on shaft 158, which carries handwheel 52. A hand-screw 159 is tightened to lock shaft 158 in an adjusted position.

The resulting vertical movement of box 153 moves the shaft 51. Within box 153 is a double ball-bearing structure with inner race portions rigid with shaft 51 and outer race portions rigid with box 153. Shaft 51 has a shoulder 160 on which rests a collar 161, which together with locking nuts 162 on a threaded portion 163 of shaft 51 clamps inner races 164 and 165 to move with the shaft. The outer and stationary races 166 and 167 are secured in box 153 in part by the ring gear 155, as shown. An oil seal is indicated at 168.

In operation of the machine shown in Figs. 1 to 11, meat products to be comminuted are fed into the funnel 71. The machine must not be operated without material to be comminuted. Operation quickly lowers the level of material above plate 73, and the level is preferably maintained as high as possible in the funnel 71. The fleshy character of the material gives it a hydraulic head to supplement the propelling action of cutters 84 and the suction from the throw-out rotor 125, the suction being especially greater when the seal is in place. Because of the suction the packing 62 between housings 54 and 60 and the packing 72 between housing 60 and funnel 71, prevent the entry of air to form bubbles above the plate 78, and the ring seal prevents the entry of air below the plate 78. The propelling action of cutters 84, the weight or hydraulic head of the incoming material, and the pumping action of rotor 125 create a pressure for discharge through spout 56, so that a conduit may be attached to convey the material to any desired location.

In operating a machine as described at 3600 r.p.m., in which the annular perforated plate has diameters of 9¾ and 4¾ inches, with foramens having a diameter of .055 inch, a mixture of meat products for producing frankfurters, for example, is processed at the rate of 275 lbs. per minute.

A number of changes have been made in the cutting rotor. The leading knife-edge of the arm has been moved from its location substantially in an axial plane, as seen in Fig. 3, so as to lie forward of an axial plane through its tip. The trailing cutting edge has been moved more to the rear of the axial plane through its tip than is the trailing edge 97. Accordingly, the two replaceable cutters 84 have been made integral as a one-piece rotor to fit onto a modified knife-holder, comparable to the knife-holder 78. The rotor itself is obviously most conveniently made as an integral body, but the invention is not so limited. The height of the pressure pocket may be made less in the modified cutting rotors; it may be made variable by using an adjustable insert which provides the trailing edge; and it may be made constant by providing a non-adjustable but replaceable insert which provides the trailing cutting edge. Furthermore, as a result of forming a one-piece rotor, the various surfaces of the rotor may be formed for hydrodynamic flow, for example, by eliminating the abrupt rear ends of the cutter arms 84 and the diametric channels between them. The following description explains these features by reference to the drawings.

Figs. 12 to 18 relate to a preferred form of a cutting rotor in which the height of the pressure pocket may be maintained substantially constant by replacing an insert which provides the trailing cutting edge. The insert, however, is such that it may be resharpened if desired, thereby lowering the pressure heel. The insert comprises only a small piece of tool steel, so that economically it may be replaced at about the same cost as labor to resharpen it.

Figure 12:
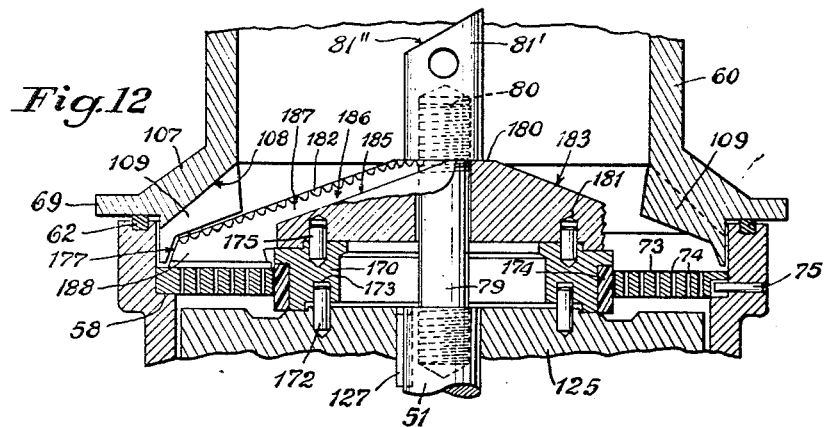
Fig. 12 is a fragmentary view similar to that of Fig. 4 showing a modified knife-holder and a modified cutting rotor.

Fig. 12 shows a broken section of apparatus similar to the showing in Fig. 4, to illustrate the mounting of a one-piece cutter on a modified knife-holder, replacing the assembly in Fig. 4 of knife-holder 78 and the two cutters 84.

The knife-holder 170 is in the form of a ring resting concentrically on the ejection rotor 125 and is non-rotatably connected to it by pins 172 fixed in the ejection rotor 125 for entry in holes 173. The lower portion of the rim of the knife-holder 170 is preferably provided as a replaceable tough plastic ring 174 preferentially to take the incidental wear from the perforated plate 73 with which it has slight clearance. The ring 170 has fixed pins 175 extending from its upper face to engage a cutting rotor, of which several forms are shown and hereinafter described.

Figure 13:
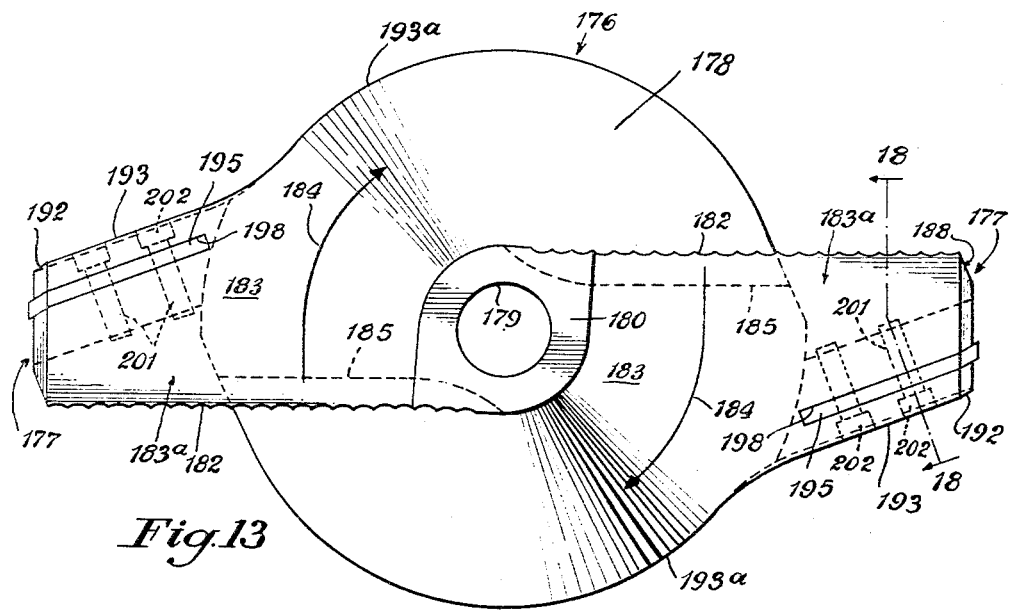
Fig. 13 is an enlarged plan view of the rotor shown in Fig. 12.
Figure 14:
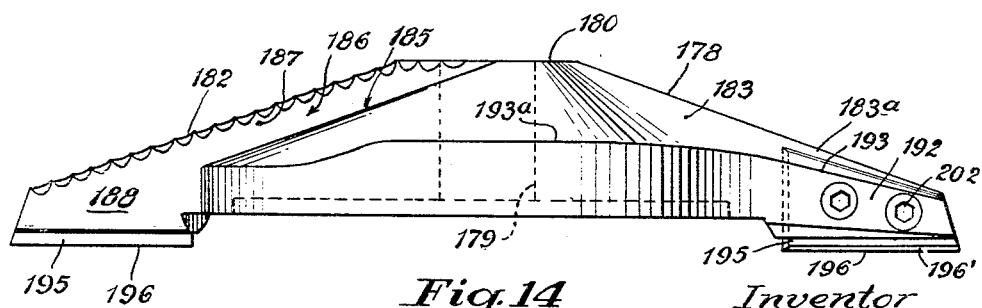
Fig. 14 is a side elevation of the rotor shown in Fig. 13 as positioned in Fig. 12.
Figure 15:
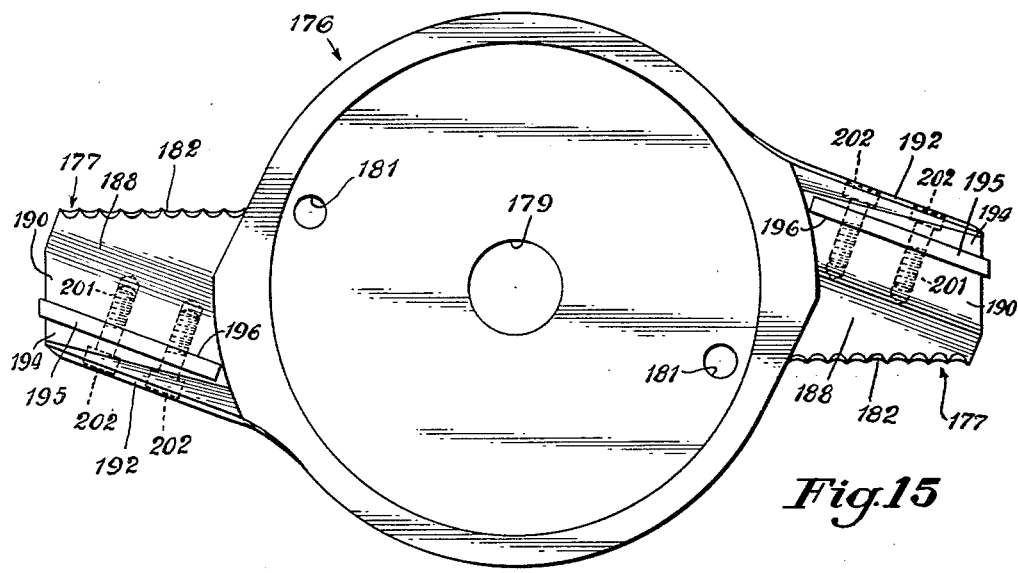
Fig. 15 is a view of the underside of the rotor shown in Fig. 13.
Figures 16, 17:
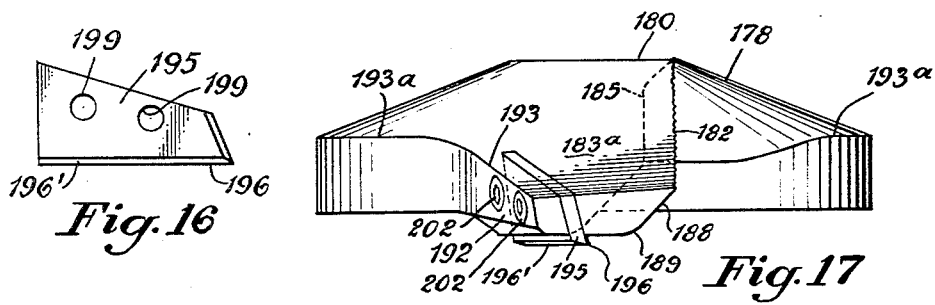
Fig. 16 is a view of the removable blade in the rotor of Fig. 13 to provide the trailing cutting edge.
Fig. 17 is a side elevation viewed from the right side of the rotor shown in Fig. 13.

The preferred rotor 176 is shown in plan view in Fig. 13 having two cutting arms 177 projecting from a generally circular body portion 178, with a concentric hole 179 surrounded by a plane area 180. The hole 179 receives the stud 79 from shaft 51, so that the threaded extension 80 of said stud receives the nut 81' holding the cutting rotor onto the knife-holder 170. The pins 175 enter holes 181 in the underside of the cutter. The nut 81' has a truncated end 81".

From the periphery of the flat top 180 there are two oppositely directed tangential cutting edges 182, preferably serrated, which extend as straight lines outwardly and downwardly toward plate 73 when mounted as described. Each of these edges 182 in operation is a leading cutting edge constituting part of the body portion 178 and part of an arm 177. Over the body portion 178 each of two top faces 183 of the rotor slopes smoothly away and only slightly downwardly in the directions of an arrow 184 from each cutting edge 182 to a line 185 inwardly of and below the opposite cutting edge 182 to which it is parallel. This forms a throat 186 under each cutting edge, which throat has an upper face 187, which together with top face 183 forms that part of the cutting edge 182 which lies within the body portion 178.

Figures 18, 20:
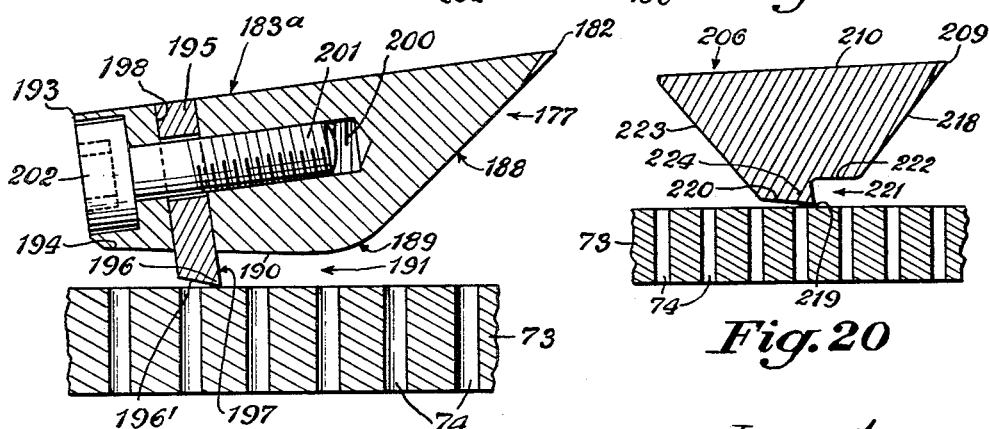
Fig. 18 is an enlarged cross-section of the rotor on the line 18—18 of Fig. 13 showing its relation to the perforated plate.
Fig. 20 is an enlarged cross-section on the line 20—20 of Fig. 19 similar to Fig. 18.
Figure 19:
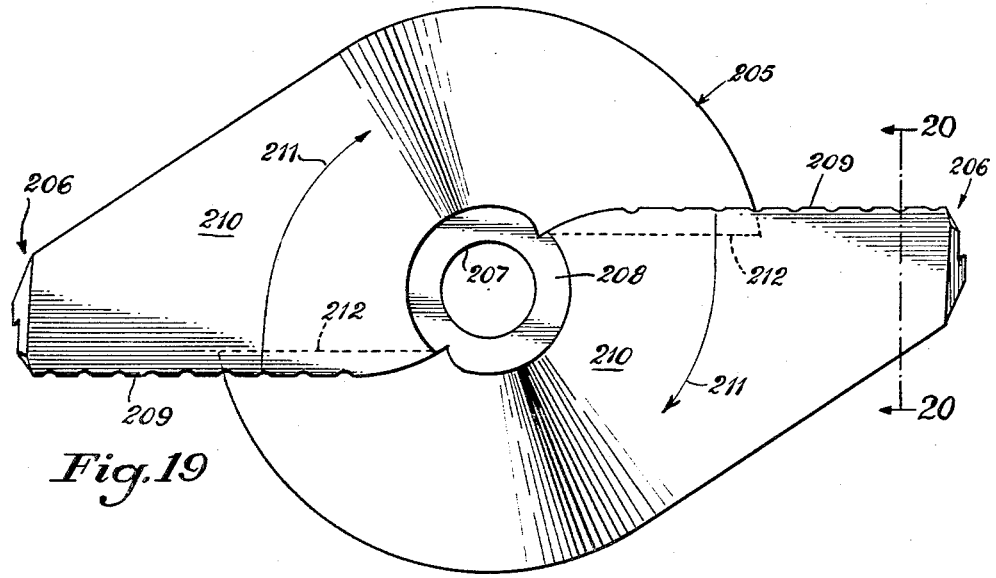
Fig. 19 is a plan view similar to that of Fig. 13 showing a modified rotor.
Figure 21:
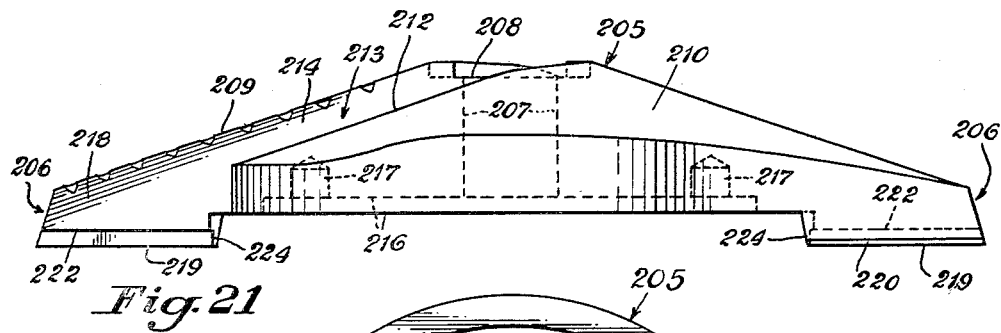
Fig. 21 is a side elevation of the rotor shown in Fig. 19 similar to Fig. 14.
Figure 22:
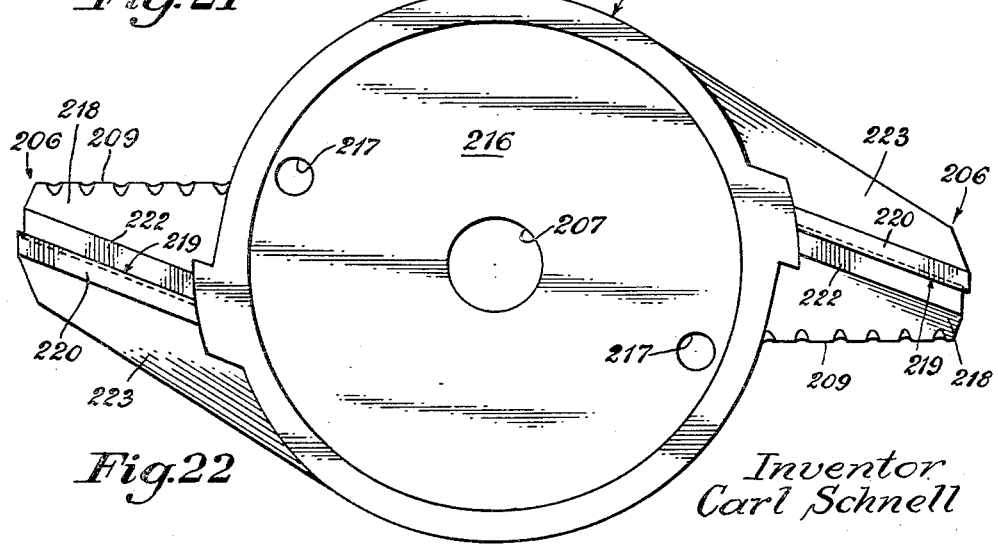
Fig. 22 is a view of the underside of the rotor shown in Fig. 19 similar to Fig. 15.

The arm 177 is formed on its top by a smooth extension 183ᵃ of the top face 183 of the body portion, and consequently, it slopes rearwardly in rotation away from the cutting edge 182, the angle being shown in Fig. 18. The upper face 187 of the throat 186 lies in a plane forming an inclined propelling face 188 of the arm 177 for forcing material axially forward toward the plate 73, (Fig. 18). The propelling face 188 at its lower region 189 becomes less inclined and is preferably extended as a substantially horizontal face 190 forming the desired pressure heel spaced from plate 73 by a distance which is as great as and preferably greater than the distance across openings 74 in the plate. Numeral 191 designates the pressure pocket, which lies below the level of the interface between the body portion 178 and the knife-holder 170.

The trailing portion of the arm 177 has a trailing face 192 (Fig. 17) meeting top face 183ᵃ at corner 193, which corner is extended as the circular edge 193ᵃ of the body portion 178. For convenience, the upper face 190 of the pressure pocket is extended back to the trailing face 192 as indicated by the numeral 194 behind a cutting blade 195, which provides the trailing cutting edge 196 with its back relief 196' of about 14°. The exposed leading face 197 of the blade 195 is part of the propelling face connecting the leading and trailing cutting edges.

The cutting blade 195 is an insert (Fig. 16) fitting in a slot 198 cut into the arm from its outer end. Two holes 199 through the blade register with threaded holes 200 into the arm from its trailing face 192 for mounting screws 201 which have their heads 202 recessed into the face 192.

As shown in Fig. 12, the ends of the arms 177 conform to the contour of the lugs 109, so as to shear therewith as described for the arms of cutters 84. The trailing cutting edge 196 is at a greater angle rearwardly of the axial plane through its tip than is the trailing edge 97 of cutter 84. The smoothly extending surfaces of the rotor effect a smooth flow of material in the apparatus.

A modified form of the one-piece rotor above described is shown in Figs. 19 to 22, in which the body and both cutting edges are integral. The cutter has a circular body portion 205 with projecting arms 206 extending outwardly. Around the axial bore 207 is a slightly recessed flat area 208 for the nut 81' of Fig. 12. The arms have upper leading cutting edges 209 which are straight lines parallel to a rearward axial plane through the tip of the cutting edges. The top of the cutter outside of the flat area 208 comprises two smooth portions 210 each extending smoothly rearwardly in rotation from the cutting edges 209, sloping slightly to the rear in the directions of arrow 211, part of each face 210 defining a half of the top of circular body portion 205 and part defining the top of an arm 206. Because of said rearward sloping of the faces 210 over the body portion, each face 210 terminates inwardly under a knife-edge 209 at a line 212 which is the bottom of a throat 213, the upper face 214 of which forms knife-edge 209 in conjunction with top face 210. The underside 216 of the body portion fits on knife-holder 170 (shown in Fig. 12) and has holes 217 to receive pins 175.

The face 214 of throat 213 lies in a plane 218 which forms a propelling face of the arm 206. The trailing cutting edge 219, with its relief 220 (Fig. 20) lies rearwardly of said propelling face 218 and cooperates in forming a pressure pocket 221 between pressure heel 222 and plate 73 in use of the cutting rotor. The rear face 223 of the arm 206 forms the rear face of a projection 224 which terminates in the relieved cutting edge 219.

The cutting edges 219 of Figs. 19 to 22 may be resharpened thereby shortening the projection 224 and lowering the pressure heel 222.

Fig. 23 is a fragmentary view of a comminuting chamber, similar to that shown in Fig. 12, showing a portion of a cutter in operating position therein. The housing 226 has a ledge 227 for perforated plate 228, and a rim 229 with packing 230 sealing the interface with a neckpiece 231 having sloping wall 232 and downwardly extending lugs 233. On the plate is a cutter arm 234 of which only the face 235 and top face 236 are shown. The entire cutter is shown in Fig. 24 which is taken in cross-section on line 24—24 of Fig. 23 as extended in full. The rotor has the same general form as described for Figs. 19 to 22, but with modification of the arm 234 in cross-section as shown in Fig. 25. It has a leading cutting edge 237, a propelling face 238 leading to pressure pocket 239 forward of trailing cutting edge 241 and between the heel 240 and plate 228. The pocket 239 is narrower at its entry than within, forming a space between arrows 243 through which particles are squeezed and then trapped.

Fig. 26 shows in cross-section a modified form of arm in which the trailing cutting edge is a replaceable and adjustable blade. The arm has a leading cutting edge 245 forward of a rearwardly sloping face 246 which with forward propelling face 247 forms the cutting edge 245. The lower portion of face 247 curves forming a lowermost portion as a pressure heel 248 and a trailing face 249.

Into the face 249 is a threaded opening 250 for mounting screws 251 which bind a blade 252 to the face 249. Blade 252 has holes 253 larger than screw 251, and a relieved cutting edge 254 forwardly directed. By adjusting the position of the blade 252 on the face 249, the pressure pocket ahead of edge 254 may be adjusted in its height between heel 248 and perforated plate 255.

Figure 27:
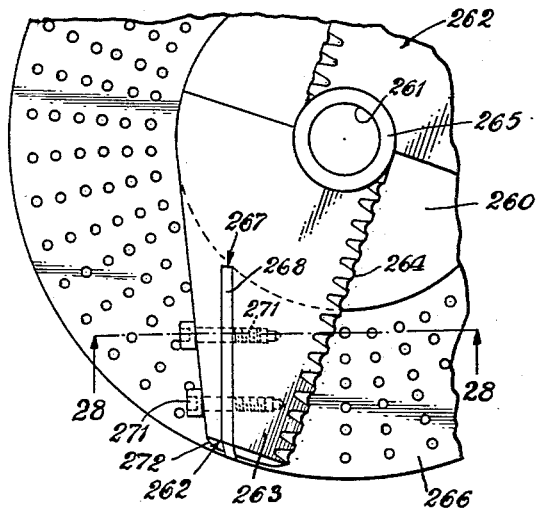
Fig. 27 is a fragmentary plan view of another modification of the cutting rotor showing an adjustable blade.
Figure 28:
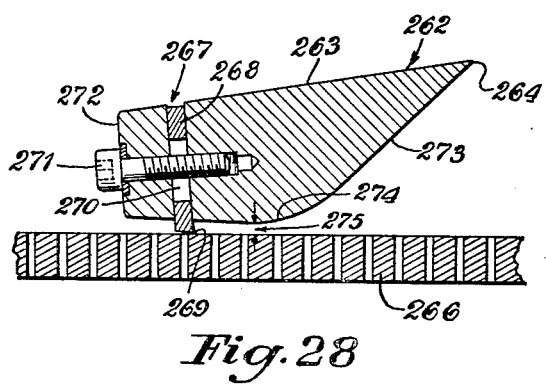
Fig. 28 is an enlarged cross-section similar to Figs. 25 and 26 on the line 28—28 of Fig. 27 illustrating the adjustable blade.

Figs. 27 and 28 represent a modified cutter in which the trailing cutting edge is an adjustable insert housed in a slot formed inwardly from the end of the cutter arm. Fig. 27 shows the rotor as being similar to those above described, having a circular body portion 260 to be mounted on a shaft extending through bore 261. It has projecting arms 262, each with a top face 263 continuous over the top of the body portion. The top face 263 forms one face of a leading cutting edge 264 extending tangentially from a flat annular area 265 outwardly and downwardly toward perforated plate 266 over which the cutter is mounted.

A slot 267 is formed into the arm for a blade 268, the bottom of which has a relieved forwardly directed cutting edge 269 to ride on plate 266. Blade 268 has holes 270 larger than screws 271 which bind the blade in the slot from the face 272. From the leading cutting edge 264 propelling face 273 is formed to provide pressure heel 274 and pressure pocket 275, the height of which between the heel 274 and plate 266 is adjustable by shifting the position of the blade 268.

In conclusion, the cutting rotor embodiments referred to above show a hydrodynamically balanced propelling cutting rotor having at least one propelling arm, the propelling arm having a leading edge and a trailing cutting edge. The propelling surface connecting these edges is shaped to force material forwardly toward the trailing edge and has a portion more directly facing into the path of forward propulsion adapted rapidly to diminish the rate of forward propulsion in an area immediately in advance of the trailing edge. The described cutting rotors have propelling arms in which the trailing cutting edge in rotation lies rearwardly of an axial plane passing through its tip. The cutting arms shown have a pressure heel and pocket which is substantially parallel to the trailing cutting edge, and of which the longitudinal axis is dynamically inclined to provide a path for movement of material along the arm. The cutting rotors referred to above have at least one propelling arm with a trailing cutting edge that generates a plane in rotation and forms an acute angle with a radius from the axis of rotation to the outer end of said trailing edge, said leading edge when extended forming an acute angle with the plane of rotation with said trailing edge. When the rotor with its propelling arm of the rotor is rotated, the solid of revolution generated by the leading and trailing edges includes the entire body of the arm. In these rotors, the surface of each cutting arm, rearwardly from the leading edge, slopes smoothly away from the path of rotation and also slopes smoothly outwardly toward the plane of rotation of the trailing cutting edge.

The foregoing detailed description has been given for clearness of understanding only, and no necessary limitations should be understood therefrom, as modifications will be obvious to those skilled in the art.

I claim:

1. An axially rotatable balanced high speed propelling cutting rotor for comminuting material, said rotor having at least one propelling arm extending away from said axis to a tip, said arm having a leading cutting edge, a trailing cutting edge, and a propelling face therebetween, said edges constituting boundaries of the face, the axial distance between said edges diminishing toward the tip to provide substantial hydrodynamic balance, said face having a portion extending from said leading cutting edge inclined forwardly in the direction of rotation and said face having a changing and increasing degree of inclination relative to said axis as said face approaches said trailing cutting edge, said changing and increasing degree of inclination of said face providing a pressure pocket immediately adjacent said trailing cutting edge extending forwardly in rotation of the trailing cutting edge.

2. The rotor of claim 1 wherein said arm has a surface sloping gradually rearwardly in rotation away from the leading edge toward the cutting path of the trailing edge.

3. The rotor of claim 1 wherein the said trailing cutting edge is in the form of a chisel.

4. The rotor of claim 1 wherein the pressure pocket is substantially parallel to the cutting path generated by rotation of said trailing edge.

5. The rotor of claim 1 wherein said pressure pocket is substantially coextensive with the trailing edge.

6. The rotor of claim 1 wherein the trailing edge lies rearwardly in rotation of a plane passing through the axis of rotation and the tip of the trailing edge, and said face is shaped and positioned to provide an axially gathering surface for axially gathering material which surface leads to the pressure pocket, said pocket extending rearwardly in rotation of a plane passing through the axis of rotation and the tip of the trailing edge and exerting a force tending to oppose movement of material outwardly toward the tip in a region adjacent the trailing edge.

7. An axially rotatable balanced high speed essentially winged-discoidal propelling cutting rotor for comminuting material, said rotor having at least one propelling arm extending outwardly away from its axis to a tip, said arm having a leading cutting edge, a trailing cutting edge, and a propelling face therebetween extending outwardly of said axis, said edges extending outwardly of said axis and constituting boundaries of the face, the axial distance between said cutting edges diminishing toward the tip to provide substantial hydrodynamic balance, said arm having a body portion extending rearwardly in rotation of the propelling face, said body portion sloping gradually rearwardly in rotation away from the leading edge toward the cutting path of the trailing edge, said face having a portion extending from said leading cutting edge inclined forwardly in the direction of rotation and said face having a changing and increasing degree of inclination relative to said axis as said face approaches said trailing cutting edge, said changing and increasing degree of inclination of said face providing a pressure pocket immediately adjacent said trailing edge extending outwardly of said axis and forwardly in rotation of the trailing cutting edge, said body portion at any point along the leading edge extending a distance rearwardly in rotation that exceeds the axial distance between said edges at said point.

8. An axially rotatable balanced high speed essentially winged-discoidal propelling cutting rotor for comminuting material, said rotor having at least one propelling arm extending outwardly away from its axis to a tip, said arm having a leading cutting edge, a trailing cutting edge, and a propelling face therebetween extending outwardly of said axis and constituting boundaries of the face, said arm having a body portion extending rearwardly in rotation of the propelling face, said face having a portion extending from said leading cutting edge inclined forwardly in the direction of rotation and said face having a changing and increasing degree of inclination relative to said axis as said face approaches said trailing cutting edge, said changing and increasing degree of inclination of said face providing a pressure pocket immediately adjacent said trailing cutting edge extending outwardly of said axis and forwardly in rotation of the trailing cutting edge, said body portion at any point along the leading edge extending a distance rearwardly in rotation that exceeds the axial distance between said edges at said point, the trailing edge lying rearwardly in rotation of a plane passing through the axis of rotation and the tip of the trailing edge, said face being shaped and positioned to provide an axially gathering surface for axially gathering material which surface leads to said pressure pocket, and said pocket extending rearwardly in rotation of a plane passing through the axis of rotation and the tip of the trailing edge and exerting a force tending to oppose movement of material outwardly toward the tip in a region adjacent the trailing edge.

9. An axially rotatable balanced high speed essentially winged-discoidal propelling cutting rotor for comminuting material, said rotor having at least one propelling arm extending outwardly from its axis to a tip, said arm having a leading cutting edge, a trailing cutting edge that generates in rotation a plane, and a propelling face therebetween extending outwardly of said axis, said edges extending outwardly of said axis and constituting boundaries of the face, said arm having a body portion extending rearwardly in rotation of the propelling face, said face having a portion extending downwardly and rearwardly from said leading cutting edge toward the trailing edge and said face having a changing and increasing degree of inclination relative to said axis as said face approaches said trailing cutting edge, said changing and increasing degree of inclination providing a surface extending outwardly of said axis substantially parallel to a plane generated by rotation of the trailing edge, said substantially parallel surface extending to a different surface of said face, said different surface extending downwardly and forwardly toward said trailing cutting edge, said substantially parallel surface and downwardly and forwardly extending surface intersecting at an acute angle and providing a pressure pocket immediately adjacent said trailing cutting edge extending outwardly of said axis and extending forwardly of the trailing cutting edge, said body portion at any point along the leading edge extending a distance rearwardly in rotation that exceeds the axial distance between said edges at said point.

10. An apparatus for comminuting meat and agricultural products, which comprises wall means defining in advancing and communicating sequence a supply chamber with feeding inlet opening means, a comminuting chamber, and a discharge chamber with at least one discharge outlet opening, said supply chamber being shaped and positioned for receiving material to be comminuted and continuously maintaining a head thereof, a perforate plate having a multiplicity of small openings therein forming a valve between the comminuting chamber and the discharge chamber, an axially rotatable propelling cutting rotor for comminuting material being rotatably positioned in the comminuting chamber, said rotor having at least one propelling arm extending away from said axis to a tip, said arm having a leading cutting edge, a trailing cutting edge positioned contiguous to said plate, and a propelling face therebetween to propel material toward said plate, said edges constituting boundaries of the face, the axial distance between said edges diminishing toward the tip to provide substantial hydrodynamic balance, said face having a portion extending from said leading cutting edge inclined forwardly in the direction of rotation and said face having a changing and increasing degree of inclination relative to said axis as said face approaches said trailing cutting edge, said changing and increasing degree of inclination of said face providing a pressure pocket immediately adjacent said trailing cutting edge extending forwardly in rotation of the trailing cutting edge, centrifugal ejection rotor means structurally associated with said discharge chamber, said discharge outlet opening providing means for removing comminuted material from the discharge chamber, said discharge opening being sealable against ingress of air by the passage of material therethrough during operation.

11. The apparatus of claim 10 having a rotor wherein said arm has a surface sloping gradually rearwardly in rotation away from the leading edge toward the cutting path of the trailing edge.

12. The apparatus of claim 10 having a rotor wherein the pressure pocket is substantially parallel to the cutting path generated by rotation of said trailing edge.

13. The apparatus of claim 10 having a rotor wherein the trailing edge lies rearwardly in rotation of a plane passing through the axis of rotation and the tip of the trailing edge, and said face is shaped and positioned to provide an axially gathering surface which surface leads to the pressure pocket, said pocket extending rearwardly in rotation of a plane passing through the axis of rotation and the tip of the trailing edge and exerting a force tending to oppose movement of material outwardly toward the tip in a region adjacent the trailing edge.

14. An apparatus for comminuting meat and agricultural products, which comprises wall means defining in advancing and communicating sequence a supply chamber with feeding inlet opening means, a comminuting chamber, and a discharge chamber with at least one discharge outlet opening, said supply chamber being shaped and positioned for receiving material to be comminuted and continuously maintaining a head thereof, a perforate plate having a multiplicity of small openings therein forming a valve between the comminuting chamber and the discharge chamber, an axially rotatable high speed essentially winged-discoidal propelling cutting rotor for comminuting material being rotatably positioned in the comminuting chamber, said rotor having at least one propelling arm extending outwardly away from its axis to a tip, said arm having a leading cutting edge, a trailing cutting edge positioned contiguous to said plate, and a propelling face therebetween extending outwardly of said axis to propel material toward said plate, said edges extending outwardly of said axis and constituting boundaries of the face, the axial distance between said cutting edges diminishing toward the tip to provide substantial hydrodynamic balance, said arm having a body portion extending rearwardly in rotation of the propelling face, said body portion sloping gradually rearwardly in rotation away from the leading edge toward the cutting path of the trailing edge, said face having a portion extending from said leading cutting edge inclined forwardly in the direction of rotation and said face having a changing and increasing degree of inclination relative to said axis as said face approaches said trailing cutting edge, said changing and increasing degree of inclination of said face providing a pressure pocket immediately adjacent said trailing cutting edge extending outwardly of said axis and forwardly in rotation of the trailing cutting edge, said body portion at any point along the leading edge extending a distance rearwardly in rotation that exceeds the axial distance between said edges at said point, centrifugal ejection rotor means structurally associated with said discharge chamber, said discharge outlet opening providing means for removing comminuted material from the discharge chamber, said discharge opening being sealable against ingress of air by the passage of material therethrough during operation.

15. An apparatus for comminuting meat and agricultural products, which comprises wall means defining in advancing and communicating sequence a supply chamber with feeding inlet opening means, a comminuting chamber, and a discharge chamber with at least one discharge outlet opening, said supply chamber being shaped and positioned for receiving material to be comminuted and continuously maintaining a head thereof, a perforate plate having a multiplicity of small openings therein forming a valve between the comminuting chamber and the discharge chamber, an axially rotatable high speed essentially winged-discoidal propelling cutting rotor for comminuting material being rotatably positioned in the comminuting chamber, said rotor having at least one propelling arm extending outwardly away from its axis to a tip, said arm having a leading cutting edge, a trailing cutting edge positioned contiguous to said plate, and a propelling face therebetween extending outwardly of said axis to propel material toward said plate, said edges extending outwardly of said axis and constituting boundaries of the face, said arm having a body portion extending rearwardly in rotation of the propelling face, said face having a portion extending from said leading cutting edge inclined forwardly in the direction of rotation and said face having a changing and increasing degree of inclination relative to said axis as said face approaches said trailing cutting edge, said changing and increasing degree of inclination of said face providing a pressure pocket immediately adjacent said trailing cutting edge extending outwardly of said axis and forwardly in rotation of the trailing cutting edge, said body portion at any point along the leading edge extending a distance rearwardly in rotation that exceeds the axial distance between said edges at said point, the trailing edge lying rearwardly in rotation of a plane passing through the axis of rotation and the tip of the trailing edge, said face being shaped and positioned to provide an axially gathering surface for axially gathering material which surface leads to said pressure pocket, said pocket extending rearwardly in rotation of a plane passing through the axis of rotation and the tip of the trailing edge and exerting a force tending to oppose movement of material outwardly toward the tip in a region adjacent the trailing edge, centrifugal ejection rotor means structurally associated with said discharge chamber, said discharge outlet opening providing means for removing comminuted material from the discharge chamber, said discharge opening being sealable against ingress of air by the passage of material therethrough during operation.

16. An axially rotatable balanced high speed propelling cutting rotor for comminuting food material, said rotor having a propelling arm having a portion extending outwardly thereof, the propelling arm having a leading cutting edge, a trailing cutting edge, and a propelling face having a surface extending downwardly and rearwardly from said leading cutting edge toward the trailing cutting edge, said propelling face narrowing outwardly to provide substantial hydrodynamic balance, said arm having a back surface extending rearwardly of said propelling face, and said back surface having a portion extending a distance rearwardly from any point on said leading cutting edge that exceeds the axial distance between said leading cutting edge and trailing cutting edge at said point.

17. An apparatus for comminuting food products comprising wall means defining in advancing and communicating sequence a supply chamber with feeding inlet opening means, a comminuting chamber, and a discharge chamber with at least one discharge outlet opening, a stationary perforated valve plate in said apparatus separating said comminuting and discharge chambers, said plate having a multiplicity of small openings therein, an axially rotatable high speed propelling cutting rotor for comminuting material being rotatably positioned in the comminuting chamber, said rotor having a propelling arm having a portion extending outwardly thereof, the propelling arm having a leading cutting edge, a trailing cutting edge positioned contiguous to said plate, and a propelling face having a surface extending toward the plate and rearwardly from said leading cutting edge toward the trailing cutting edge, said propelling face narrowing outwardly to provide substantial hydrodynamic balance, said arm having a back surface extending rearwardly of said propelling face, and said back surface having a portion extending a distance rearwardly from any point on said leading cutting edge that exceeds the axial distance between said leading cutting edge and trailing cutting edge at said point, and centrifugal ejection rotor means in said discharge chamber.

18. The apparatus of claim 17 wherein drive means extends from the discharge chamber to the rotor and is sealed with respect to the discharge chamber, and said rotor and ejection means are operatively connected with said drive means, whereby the food product being processed in the apparatus forms a continuous column therein that is free from ingress of air during operation of the apparatus.

19. An axially rotatable balanced high speed propelling cutting rotor for comminuting food material, said rotor having a propelling arm having a portion extending outwardly thereof, the propelling arm having a leading cutting edge, a trailing cutting edge in the form of a chisel, and a propelling face having a surface extending downwardly and rearwardly from said leading cutting edge toward the trailing cutting edge and having another surface extending downwardly and forwardly to said trailing cutting edge to provide said chisel form, said propelling face narrowing outwardly to provide substantial hydrodynamic balance.

20. The rotor of claim 19 wherein said arm has a back surface extending rearwardly of said propelling face, said outwardly extending arm being wider in a rearward direction than its height as defined by the axial distance between said leading and trailing edges.

21. An axially rotatable balanced high speed propelling cutting rotor for comminuting food material, said rotor having a propelling arm having a portion extending outwardly thereof, the propelling arm having a leading cutting edge, a trailing cutting edge, and a multiplanar propelling face having a surface extending downwardly and rearwardly from said leading cutting edge toward the trailing cutting edge, said propelling face narrowing outwardly to provide substantial hydrodynamic balance, said trailing cutting edge lying rearwardly of a plane passing through the axis of rotation of the rotor and the outer extremity of said trailing cutting edge so that the portion of said propelling face adjacent said trailing cutting edge is positioned to exert a force tending to oppose movement of material outwardly along the arm adjacent the trailing cutting edge, and the portion of the propelling face adjacent the leading cutting edge providing a downwardly gathering surface for material.

22. The rotor of claim 21 wherein the trailing cutting edge is in the form of a chisel.

23. An apparatus for comminuting food material comprising wall means defining in advancing and communicating sequence a supply chamber with feeding inlet opening means, a comminuting chamber, and a discharge chamber with at least one discharge outlet opening, a stationary perforated valve plate in said apparatus separating said comminuting and discharge chambers, said plate having a multiplicity of small openings therein, an axially rotatable high speed propelling cutting rotor for comminuting material being rotatably positioned in the comminuting chamber, said rotor having a propelling arm having a portion extending outwardly thereof, the propelling arm having a leading cutting edge, a trailing cutting edge in the form of a chisel positioned contiguous to said plate, and a propelling face having a surface extending rearwardly and toward the plate from said leading cutting edge toward the trailing cutting edge and having another surface extending forwardly and toward the plate to said trailing cutting edge, said propelling face narrowing outwardly to provide substantial hydrodynamic balance, and centrifugal ejection rotor means in said discharge chamber.

24. An apparatus for comminuting food material comprising wall means defining in advancing and communicating sequence a supply chamber with feeding inlet opening means, a comminuting chamber, and a discharge chamber with at least one discharge outlet opening, a stationary perforated valve plate in said apparatus separating said comminuting and discharge chambers, said plate having a multiplicity of small openings therein, an axially rotatable balanced high speed propelling cutting rotor for comminuting material being rotatably positioned in the comminuting chamber, said rotor having a propelling arm having a portion extending outwardly thereof, the propelling arm having a leading cutting edge, a trailing cutting edge positioned contiguous to said plate, and a multiplanar propelling face having a surface extending toward the plate and rearwardly from said leading cutting edge toward the trailing cutting edge, said propelling face narrowing outwardly to provide substantial hydrodynamic balance, said trailing cutting edge lying rearwardly of a plane passing through the axis of rotation of the rotor and the outer extremity of said trailing cutting edge so that the portion of said propelling face adjacent said trailing cutting edge is positioned to exert a force tending to oppose movement of material outwardly along the arm adjacent the trailing cutting edge, the portion of the propelling face adjacent the leading cutting edge providing an axially gathering surface for directing material toward the plate, and centrifugal ejection rotor means in said discharge chamber.

References Cited in the file of this patent

UNITED STATES PATENTS

| 756,713 | Sander | Apr. 5, 1904 |
| 2,496,359 | Rymann | Feb. 7, 1950 |
| 2,842,177 | Schnell | July 8, 1958 |

FOREIGN PATENTS

| 133,726 | Germany | Aug. 29, 1902 |
| 17,002 | Sweden | Jan. 23, 1904 |
| 585,231 | Germany | Sept. 30, 1933 |
| 665,239 | Germany | Sept. 20, 1938 |
| 179,437 | Austria | Aug. 25, 1954 |